United States Patent
Lee et al.

(10) Patent No.: US 8,314,703 B2
(45) Date of Patent: Nov. 20, 2012

(54) APPARATUS AND METHOD FOR MANAGING PRODUCT DISTRIBUTION USING SECURITY TAG

(75) Inventors: Kang Bok Lee, Daejeon (KR); Heyung Sub Lee, Daejeon (KR); Sang Yeoun Lee, Daejeon (KR); Jae Heum Lee, Daejeon (KR); Dong-Beom Shin, Daejeon (KR); Hyunseok Kim, Daejeon (KR); Jae-young Jung, Daejeon (KR); Cheol Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 657 days.

(21) Appl. No.: 12/504,397

(22) Filed: Jul. 16, 2009

(65) Prior Publication Data

US 2010/0013638 A1 Jan. 21, 2010

(30) Foreign Application Priority Data

Jul. 17, 2008 (KR) .................. 10-2008-0069497
Sep. 2, 2008 (KR) .................. 10-2008-0086299

(51) Int. Cl.
*G08B 13/14* (2006.01)
(52) U.S. Cl. ...... 340/572.1; 340/5.2; 340/5.8; 340/5.25; 340/5.86; 340/10.1

(58) Field of Classification Search .......... 340/572.1, 340/10.5, 5.8, 10.1, 5.61, 572.4, 5.1, 5.2, 340/5.21, 5.86; 235/375, 385; 713/168, 713/171
See application file for complete search history.

(56) References Cited

U.S. PATENT DOCUMENTS

| | | | |
|---|---|---|---|
| 6,880,753 B2 * | 4/2005 | Ogihara et al. | 235/385 |
| 7,657,740 B2 * | 2/2010 | Numao et al. | 713/159 |
| 2010/0148935 A1 * | 6/2010 | Graf Von Reischach et al. | 340/10.5 |

FOREIGN PATENT DOCUMENTS

| | | |
|---|---|---|
| KR | 1020050111450 A | 11/2005 |
| KR | 100601854 B1 | 7/2006 |
| KR | 1020070058225 A | 6/2007 |

* cited by examiner

*Primary Examiner* — Toan N Pham
(74) *Attorney, Agent, or Firm* — Kile Park Goekjian Reed & McManus PLLC

(57) ABSTRACT

Provided is a method and apparatus for managing a product distribution. The product distribution management method may include: reading a security key of a product from a security tag attached to the product; transferring the read security key to a security server; receiving, from the security server, first authentication information that is encrypted using the security key; receiving, from the security tag, second authentication information that is encrypted using the security key; and determining whether the security tag is duplicated, based on the first authentication information and the second authentication information.

9 Claims, 9 Drawing Sheets

APPARATUS AND METHOD FOR MANAGING PRODUCT DISTRIBUTION USING SECURITY TAG

CROSS-REFERENCE TO RELATED APPLICATIONS

This application claims the benefit of Korean Patent Application No. 10-2008-0069497, filed on Jul. 17, 2008, and Korean Patent Application No. 10-2008-0086299, filed on Sep. 2, 2008, in the Korean Intellectual Property Office, the disclosures of which are incorporated herein by reference.

BACKGROUND

1. Field of the Invention

The present invention relates to a method and apparatus for managing a product distribution, and more particularly, to a method and apparatus for managing a product distribution using a security tag.

2. Description of the Related Art

Generally, a product distribution may be readily managed using a Radio Frequency Identification (RFID) tag.

Hereinafter, a method of managing the product distribution using the RFID tag will be described.

FIG. 1 illustrates a process of writing product information in a tag in a product distribution management apparatus according to a conventional art, and FIG. 2 illustrates a process of reading product information from a tag according in a product distribution management apparatus to the conventional art.

Referring to FIG. 1, the product distribution management apparatus may include an RFID manager 101, a product data server 103, a passive reader 105, and an RFID tag 107.

When a product registration request for a product is received, the RFID manager 101 may assign, to the product, a unique item identifier (UII) corresponding to a serial number of the product, and transfer the UII to the passive reader 105. Also, the RFID reader 101 may transfer the UII and product information associated with the product to the product data server 103.

Here, the passive reader 105 may be a "writing" reader and may write the received UII in the RFID tag 107. The RFID tag 107 with the written UII may be attached to the product.

Referring to FIG. 2, the product distribution management apparatus may include a passive reader 201, an Operation Data Store (ODS) proxy server 203, a product data server 205, and an RFID tag 207.

Here, the passive reader 201 may be a "reading" reader. When a product is stored, the passive reader 201 may read an UII from the RFID tag 207 attached to the product.

When a request for a product data server address managing product information associated with the product corresponding to the UII is received from the passive reader 201, the ODS proxy server 203 may transfer the product data server address to the passive reader 201.

When a request for product information associated with the product corresponding to the UII is received from the passive reader 201, the product data server 205 may transfer the product information to the passive reader 201.

In the conventional art, when a product distribution management apparatus does not function to perform security and authentication for an RFID tag, an UII of the RFID tag may be duplicated and be attached to an unauthenticated product during a distribution process. Specifically, although a passive RFID tag used for an existing product management includes a security mechanism function using an access password, the access password may be easily analyzed and thus the RFID tag may be duplicated.

Accordingly, there is a need for a method and apparatus for managing a product distribution that may prevent a duplicate to safely manage products.

SUMMARY

An aspect of the present invention provides a method and apparatus for managing a product distribution that may safely and readily mange products using a security reader that determines whether a Radio Frequency Identification (RFID) tag is duplicated using a security key.

According to an aspect of the present invention, there is provided an apparatus for managing a product distribution, the apparatus including: a reading unit to read a security key of a product from a security tag attached to the product; a reception unit to receive, from the security server, first authentication information that is encrypted using the security key, and to receive, from the security tag, second authentication information that is encrypted using the security key; and a decision unit to determine whether the security tag is duplicated, based on the first authentication information and the second authentication information.

According to another aspect of the present invention, there is provided a method of managing a product distribution, the method including: reading a security key of a product from a security tag attached to the product; transferring the read security key to a security server; receiving, from the security server, first authentication information that is encrypted using the security key; receiving, from the security tag, second authentication information that is encrypted using the security key; and determining whether the security tag is duplicated, based on the first authentication information and the second authentication information.

A product distribution management apparatus according to embodiments of the present invention may determine whether a product is forged using a security reader. The security reader may determine whether an RFID tag is duplicated using a security key. Also, the product distribution management apparatus may prevent a duplicate of the RFID tag attached to the product to thereby safely and readily manage the product.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
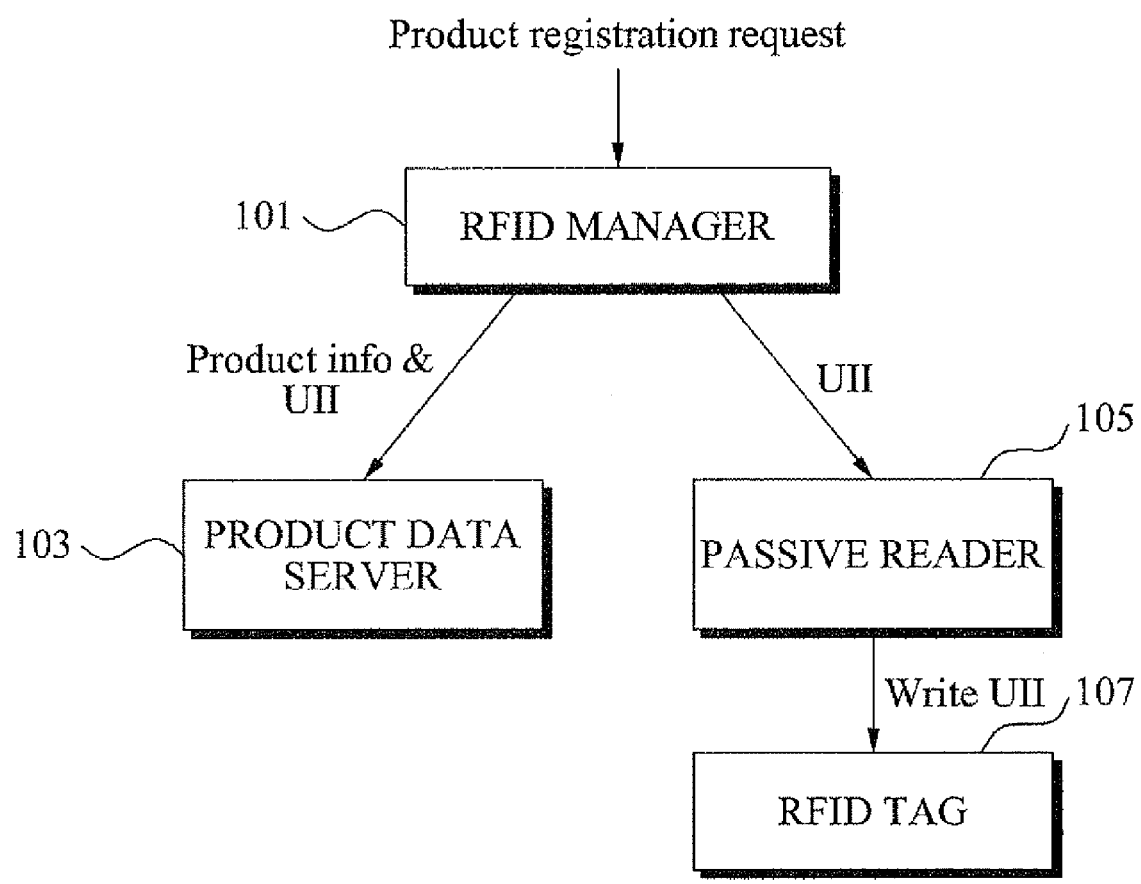
FIG. 1 illustrates a process of writing product information in a tag in a product distribution management apparatus according to a conventional art.
Figure 2:
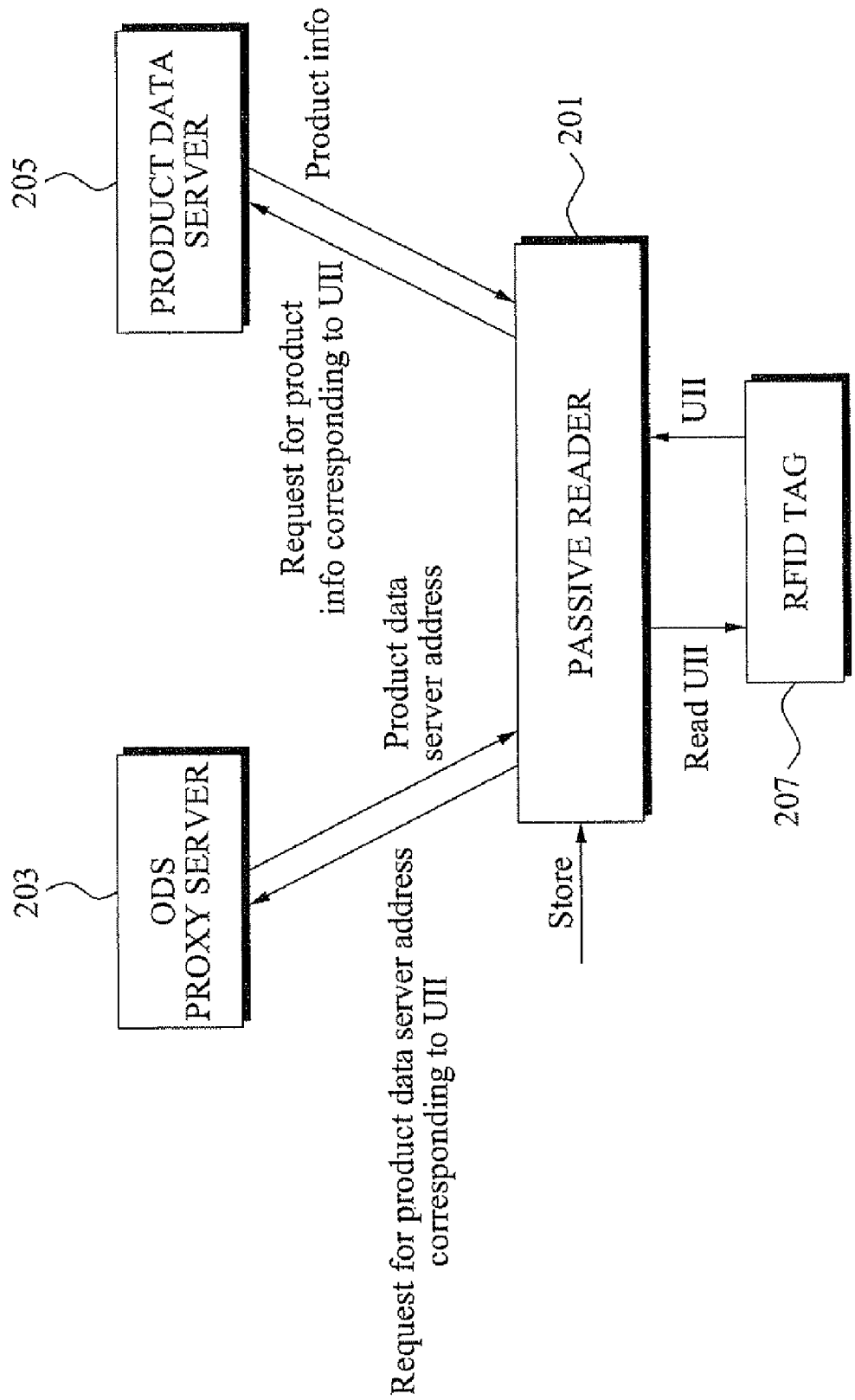
FIG. 2 illustrates a process of reading product information from a tag in a product distribution management apparatus according to the conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a product distribution management apparatus according to embodiments of the present invention will be described in detail with reference to the accompanying drawings.

Figure 3:
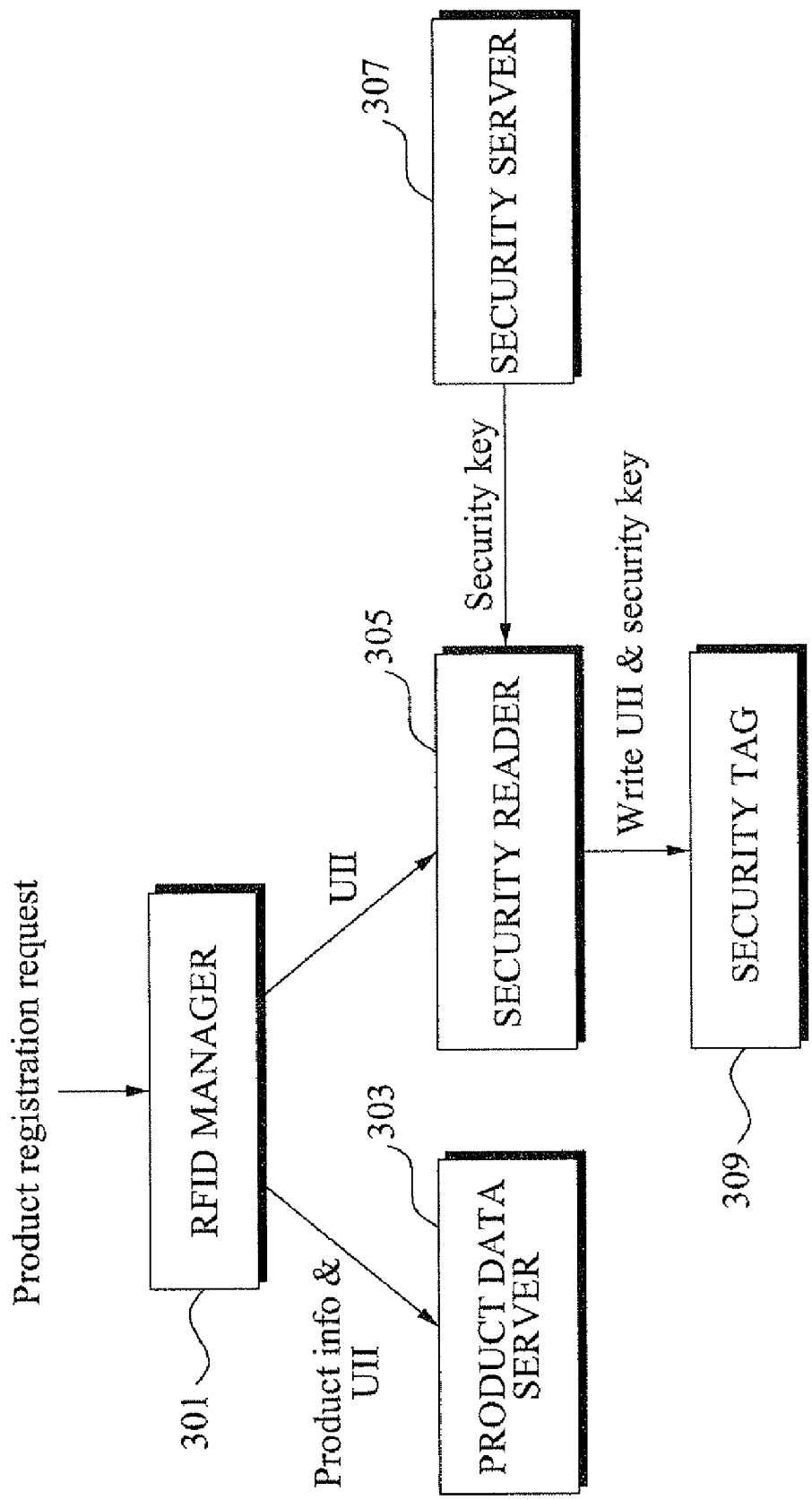
FIG. 3 illustrates a process of writing product information in a security tag in a product distribution management apparatus using the security tag according to an embodiment of the present invention.
Figure 4:
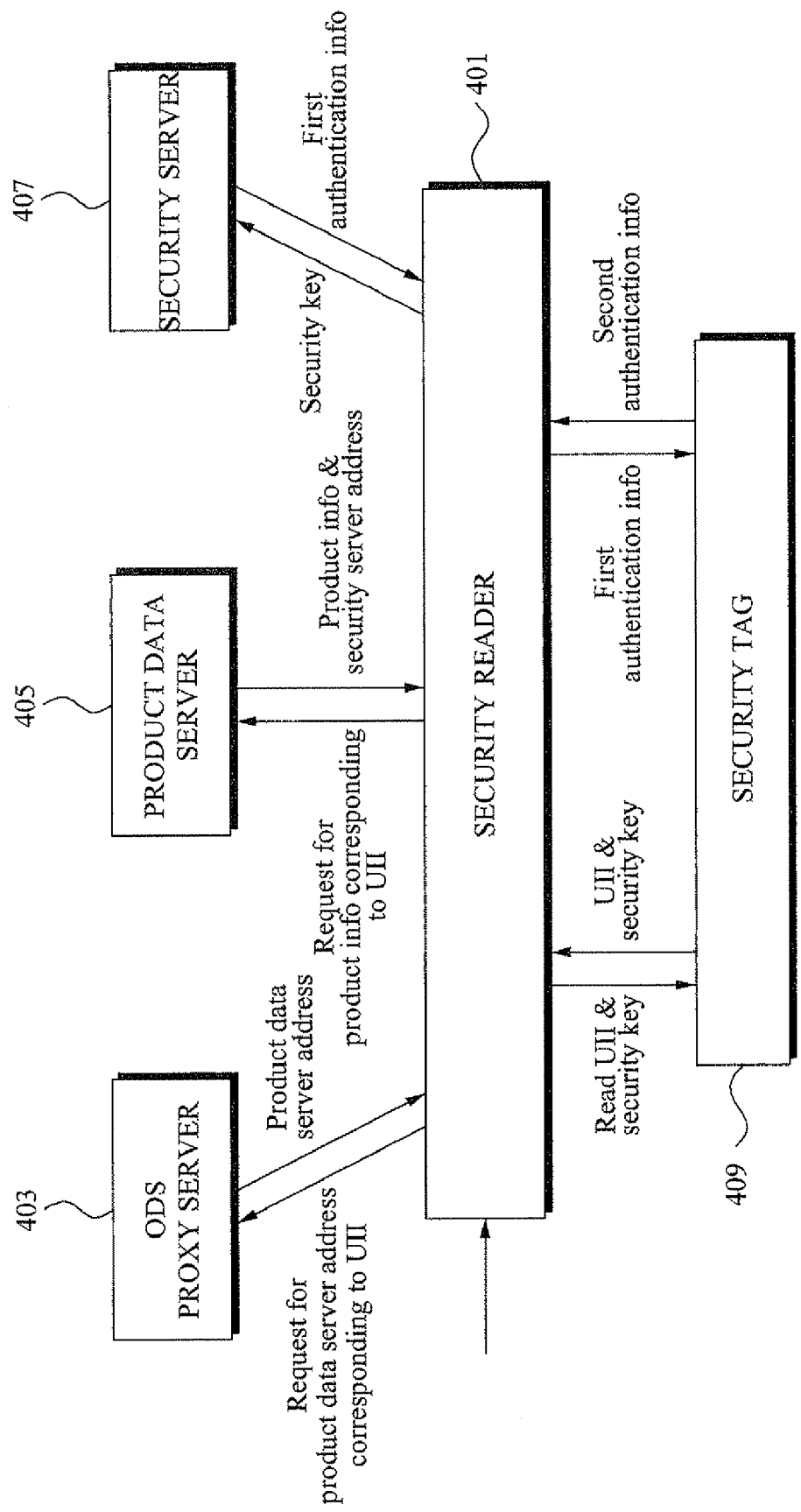
FIG. 4 illustrates a process of reading product information from a security tag in a product distribution management apparatus using the security tag according to an embodiment of the present invention.

FIG. 3 illustrates a process of writing product information in a security tag in a product distribution management apparatus using the security tag according to an embodiment of the present invention, and FIG. 4 illustrates a process of reading product information from a security tag in a product distribution management apparatus using the security tag according to an embodiment of the present invention.

Referring to FIG. 3, the product distribution management apparatus may include a Radio Frequency Identification (RFID) manager 301, a product data server 303, a security reader 305, a security server 307, and a security tag 309.

When a product registration request for a product is received, the Radio Frequency Identification (RFID) manager 301 may assign a unique item identifier (UII) to the product, and transfer the assigned UII to the security reader 305. Also, the RFID manager 301 may transfer, to the product data server 303, the assigned UII and product information associated with the product.

The security server 307 may table and manage a security key for each UII of the product, and may provide the security key to the security reader 305.

Here, the security reader 305 may be a "writing" reader. The security reader 305 may write, in the security tag 309, the UII that is received from the RFID manager 301 and the security key, corresponding to the UII, that is received from the security server 307. The security tag 309 denotes an RFID tag where the UII and the security key corresponding to the UII are written.

The RFID manager 301 may attach, to the product, the security tag 309 where the UII and the security key are written.

Referring to FIG. 4, the product distribution management apparatus may include a security reader 401, an Operation Data Store (ODS) proxy server 403, a product data server 405, a security server 407, and a security tag 409.

Here, the security reader 401 may be a "reading" reader. When a product is stored, the security reader 401 may read an UII and a security key from the security tag 409 attached to the product. The UII and the security key corresponding to the UII may be pre-stored in the security tag 409. Also, the security reader 401 may transfer, to the security tag 409, server authentication information that is received from the security server 407.

When a request for a product data server address managing product information associated with the product corresponding to the till is received from the security reader 401, the ODS proxy server 403 may transfer the product data server address to the security reader 401.

The product data server 405 may manage and store the product information associated with the product for each serial number of the product. When a request for product information associated with the product corresponding to the UII is received from the security reader 401, the product data server 405 may transfer the product information to the security reader 401. In addition to the product information, the product data server 405 may further transfer a security server address.

When a security key is received from the security reader 401, the security server 407 may transfer, to the security reader 401, first authentication information that is encrypted using the security key, that is, the server authentication information.

When the encrypted first authentication information is received from the security reader 401, the security tag 409 may decrypt the first authentication information using the security key stored in the security tag 409. Also, the security tag 409 may transfer, to the security reader 401, second authentication information that is generated by decrypting the first authentication information and by re-encrypting the decrypted first authentication information using the security key, that is, tag authentication information.

Accordingly, the security reader 401 may determine whether the security tag 409 is duplicated, based on the first authentication information that is received from the security sever 407 and the second authentication information that is received from the security tag 409. When the first authentication information matches the second authentication information, the security reader 401 may determine the attached security tag 409 attached to the product is not duplicated. Conversely, when the first authentication information is different from the second authentication information, the security reader 401 may determine the attached security tag 409 is duplicated.

When it is determined the security tag 409 is not duplicated, the security reader 401 may verify that the product information received from the product data server 405 is authenticated product information. The product information may include, for example, a kind, a grade, a weight, a place of origin, a distribution path, and the like, with respect to the product.

In a product distribution management apparatus according to an embodiment of the present invention, it is described that a security tag may store an UII and a product data server may store product information, but the present invention is not limited thereto. Specifically, the security tag may store both the UII and product information associated with the product corresponding to the UII.

Therefore, a product distribution management apparatus according to an embodiment of the present invention may prevent a duplicate of a security tag using a security reader The security reader may determine whether the security tag is duplicated using a security key. Through this, it is possible to safely and readily mange the product.

Figure 5:
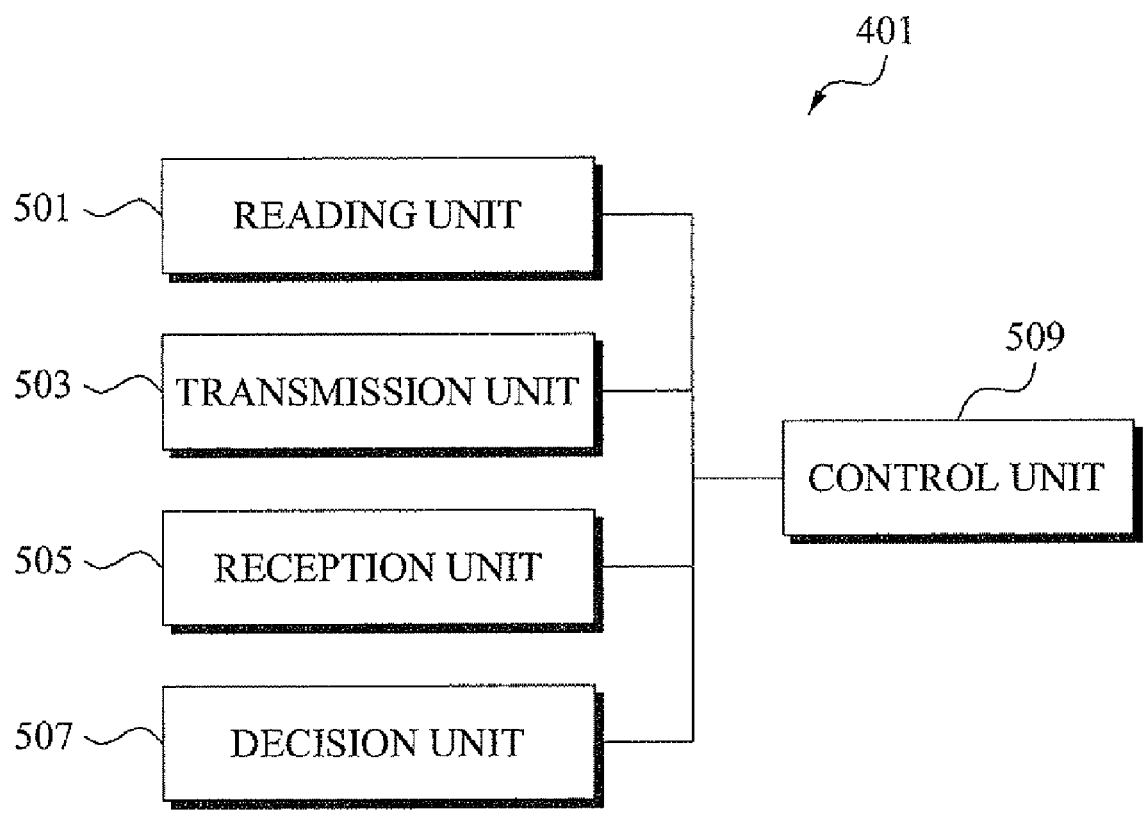
FIG. 5 is a block diagram illustrating a configuration of a security reader of FIG. 4.

FIG. 5 is a block diagram illustrating a configuration of the security reader 401 of FIG. 4.

Referring to FIG. 5, the security reader 401 may include a reading unit 501, a transmission unit 503, a reception unit

505, a decision unit 507, and a control unit 509. Hereinafter, the configuration of the security reader 401 will be described in detail with reference to FIGS. 4 and 5.

The reading unit 501 may read an UII of a product and a security key from the security tag 409 attached to the product.

The transmission unit 503 may transfer the read security key to the security server 407. Also, the transmission unit 503 may transfer a request for a product data server address to the ODS proxy server 403 and may also transfer a request for a security server address to the product data server 405.

The reception unit 505 may receive the product data server address from the ODS proxy server 403. The reception unit 505 may receive the security server address from the product data server 405 and may receive product information corresponding to a UII.

Also, the reception unit 505 may receive, from the security server 407, first authentication information that is encrypted using the security key, and may receive, from the security tag 409, second authentication information that is encrypted using the security key.

Here, the second authentication information may be generated by decrypting, by the security tag 409, the first authentication information using the security key, and by re-encrypting the decrypted first authentication information using the security key.

The decision unit 507 may determine whether the security tag 409 is duplicated, based on the first authentication and the second authentication information. Specifically, when the first authentication information matches the second authentication information, the decision unit 507 may determine the attached security tag 409 attached to the product is not duplicated. Conversely, when the first authentication information is different from the second authentication information, the decision unit 507 may determine the attached security tag 409 is duplicated.

The control unit 509 functions to control overall operations of the security reader 401.

Figure 6:
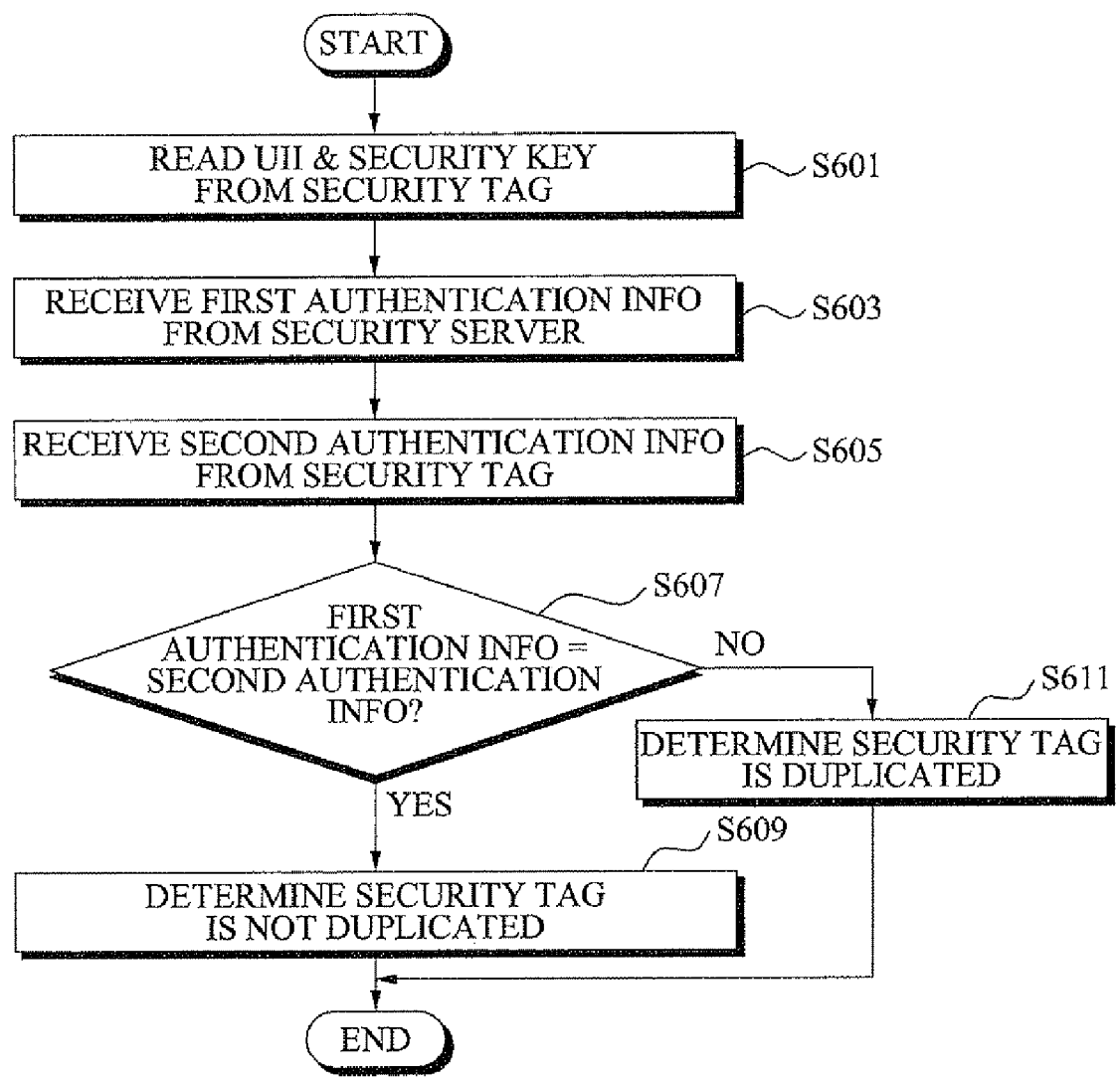
FIG. 6 is a flowchart illustrating an authentication method of a security reader according to an embodiment of the present invention.

FIG. 6 is a flowchart illustrating an authentication method of a security reader according to an embodiment of the present invention.

Referring to FIG. 6, the security reader may read a security key of a product from a security tag attached to the product in operation S601. Here, the security reader may reader, from the security tag, the security key of the product and an UII corresponding to the security key.

In operation S603, the security reader may receive first authentication information from a security server.

Specifically, the security reader may transfer the read security key to the security server and then may receive, from the security server, the first authentication information that is encrypted using the security key.

In operation S605, the security reader may receive second authentication information from the security tag.

Specifically, the security reader may transfer, to the security tag, the first authentication information that is received from the security server. The security reader may receive, from the security tag, the second authentication information that is generated by decrypting, by the security tag, the first authentication information using the security key and by re-encrypting the decrypted first authentication information using the security key.

In operation S607, the security reader may determine whether the security tag is duplicated, based on the first authentication information and the second authentication information.

Specifically, when the first authentication information matches the second authentication information, the security reader may determine the security tag attached to the product is not duplicated in operation S609. Conversely, when the first authentication information is different from the second authentication information, the security reader may determine the attached security tag is duplicated in operation S611.

Figure 7:
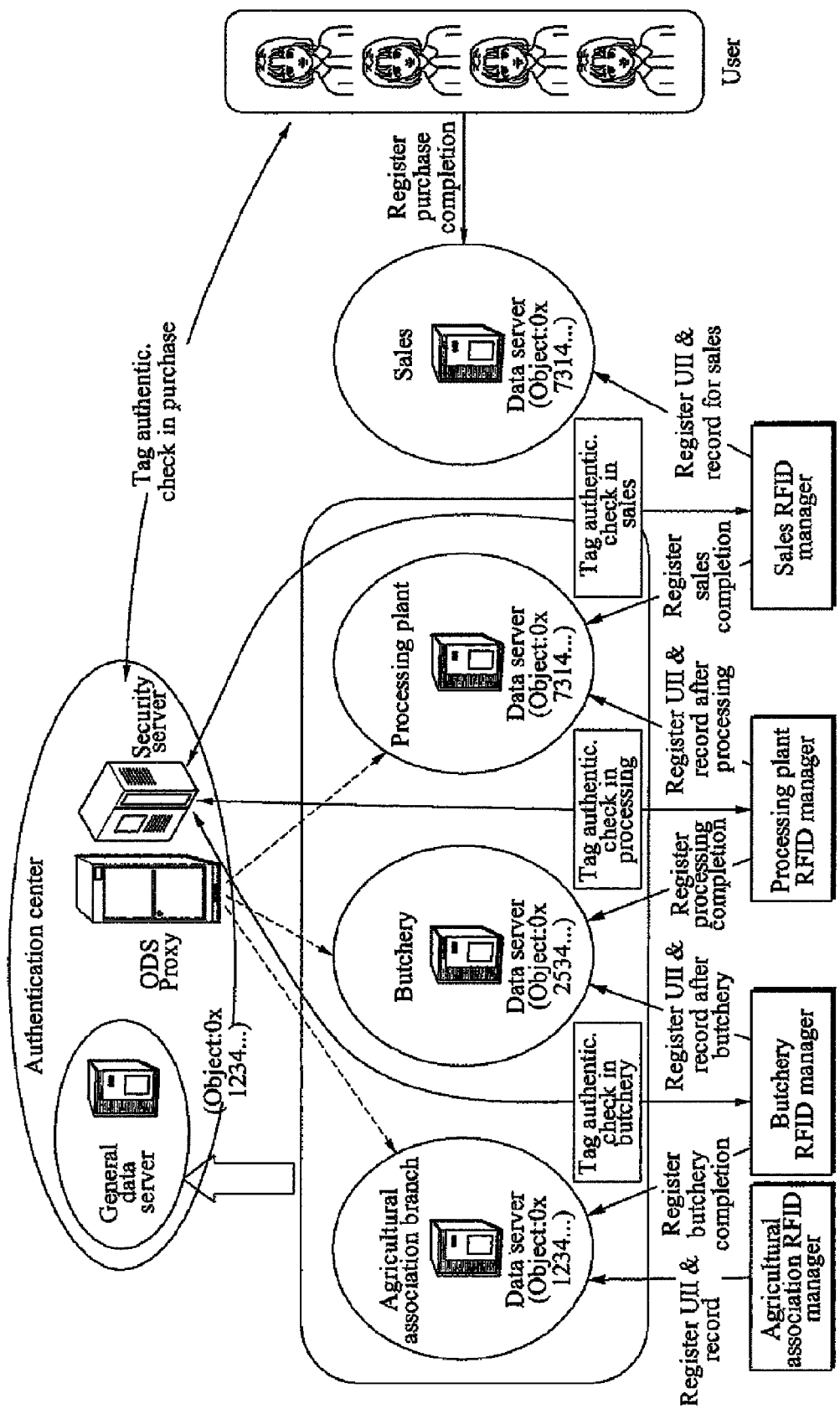
FIGS. 7 through 9 illustrate examples of a product distribution management and a product distribution network using a security reader according to an embodiment of the present invention.
Figure 8:
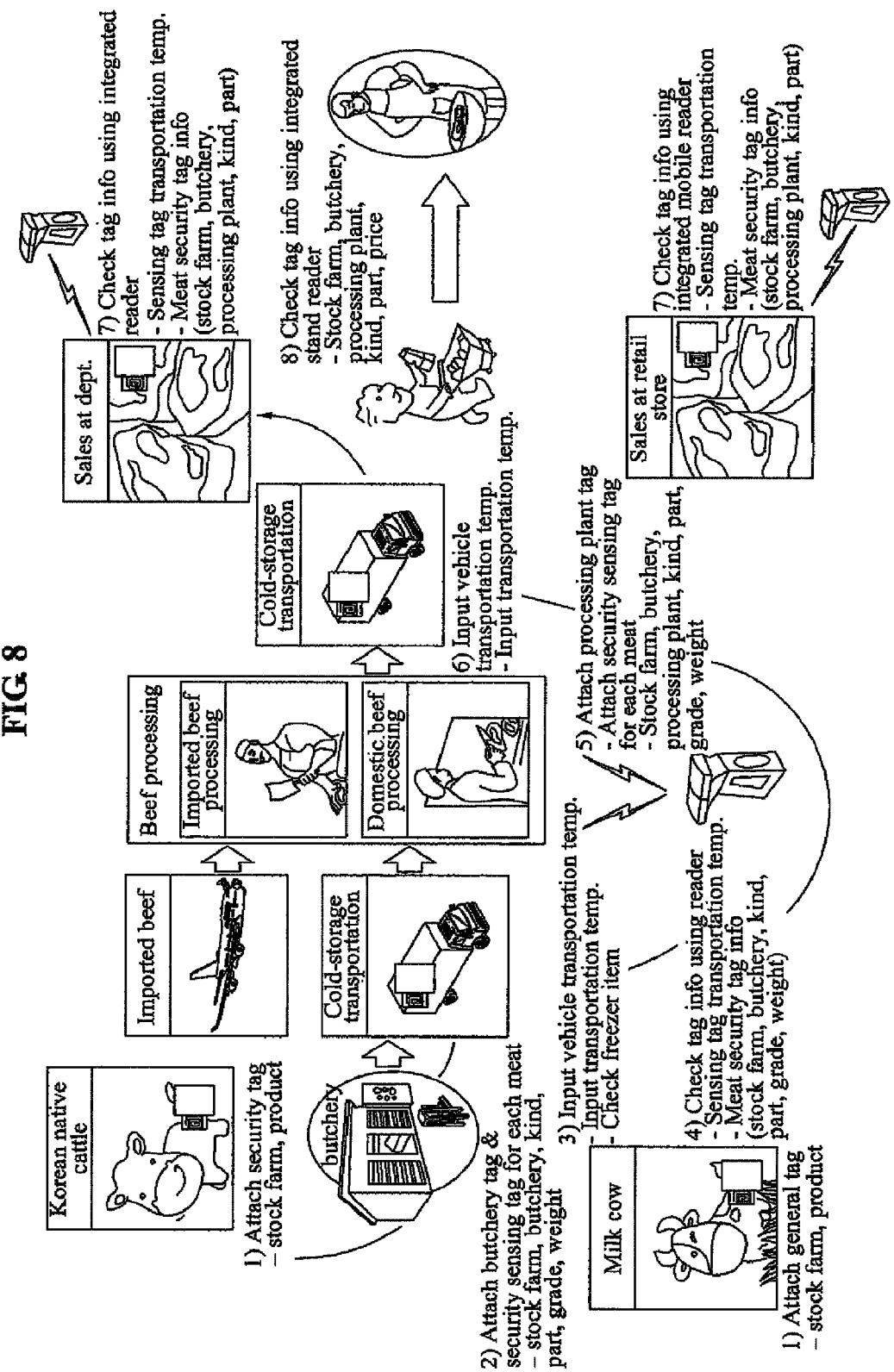
Figure 9:
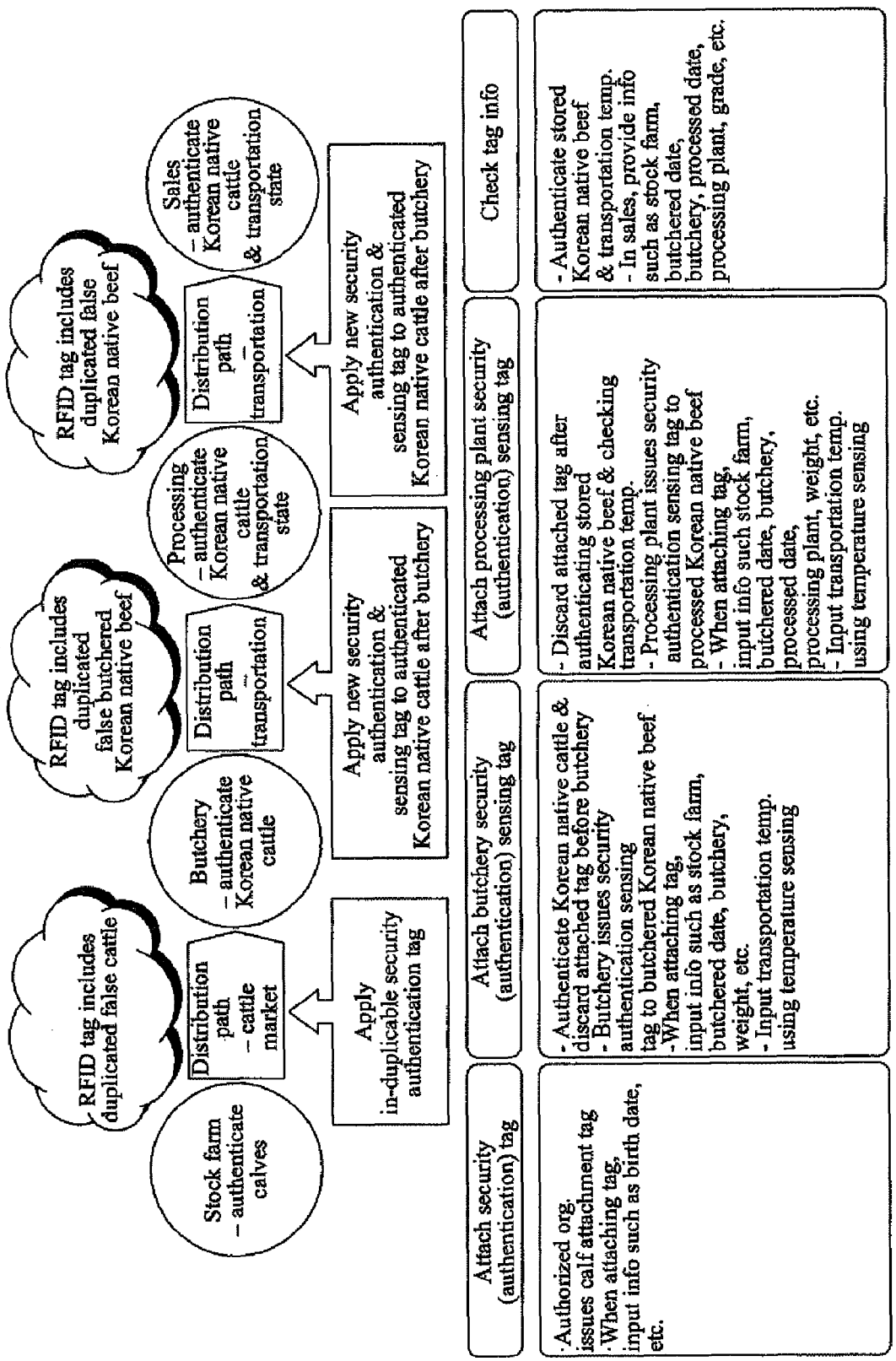

FIGS. 7 through 9 illustrate examples of a product distribution management and a product distribution network using a security reader according to an embodiment of the present invention.

Referring to FIGS. 7 through 9, a product distribution management apparatus may include a data server and a security server for each distribution process.

The data server for each distribution process may include, for example, an agricultural association branch data server, a butchery data server, a processing plant data server, and a sales data server. An RFID manager corresponding to each distribution process, for example, an agricultural association RFID manager, a butcher RFID manager, a processing plant RFID manager, and a sales RFID manager, may store product information and an UII of a product in the respective corresponding data servers.

For example, when an ox is butchered in a butchery, a tag previously attached to the ox may be discarded and a new tag may be attached to the butchered ox. When the butchered ox is a Korean native ox, a security tag may be attached thereto. An UII and a security key of the Korean native ox may be written in the security tag. When the butchered ox is a milk cow, a general tag may be attached to the milk cow.

In addition to the UII and the security key, record information associated with the butchered ox may be further written in the security tag. Here, the record information may include information such as a stock farm, a butchery, a kind, a part, a grade, a weight, and a transport temperature, and the like.

The record information and the UII of the butchered ox may be stored in the butchery data server.

When beef is processed, a tag previously attached to the beef may be discarded and a new tag where a UII and a security key are written may be attached to the processed beef Even in this case, when the processed beef is Korean native, a security tag may be attached thereto.

Record information and an UII of the processed beef may be stored in the processing plant data server.

Specifically, the Korean native ox may be transferred to a seller via the stock farm, the butchery, and the processing plant. As described above, according to an embodiment of the present invention, in each distribution process, it is possible to verify whether a product is authenticated by determining whether a security tag attached to the product is duplicated. In this instance, whether the security tag is duplicated may be verified depending on a decision result of the security tag regarding whether first authentication information that is encrypted using a security key matches second authentication information that is encrypted using the security key. The second authentication information may be generated by decrypting, by the security tag, the first authentication information using the security key and by re-encrypting the decrypted first authentication information using the security key.

According to an embodiment of the present invention, since an in-duplicable security tag is attached to Korean native cattle, it is possible to prevent a false Korean native beef, for example, milk cows or imported beef from being disguised as genuine Korean native cattle and thereby being distributed in the market.

The product distribution management method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM, flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of managing a product distribution, the method comprising:
    reading a security key of a product from a security tag attached to the product;
    transferring the read security key to a security server;
    receiving, from the security server, first authentication information that is encrypted using the security key;
    receiving, from the security tag, second authentication information that is encrypted by the security tag using the security key; and
    determining whether the security tag is duplicated, based on the first authentication information and the second authentication information.

2. The method of claim 1, wherein the receiving of the second authentication information comprises:
    transferring the first authentication information to the security tag; and
    receiving, from the security tag, the second authentication information that is generated by decrypting the first authentication information using the security key and by re-encrypting the decrypted first authentication information using the security key.

3. The method of claim 1, wherein the security key corresponds to a serial number of the product, and is pre-stored in the security tag.

4. The method of claim 1, wherein the security server tables and manages the security key for each serial number of the product.

5. An apparatus for managing a product distribution, the apparatus comprising:
    a reading unit to read a security key of a product from a security tag attached to the product;
    a reception unit to receive, from the security server, first authentication information that is encrypted using the security key, and to receive, from the security tag, second authentication information that is encrypted by the security tag using the security key; and
    a decision unit to determine whether the security tag is duplicated, based on the first authentication information and the second authentication information.

6. The apparatus of claim 5, wherein the security tag receives the first authentication information, and generates the second authentication information by decrypting the first authentication information using the security key, and by re-encrypting the decrypted first authentication information using the security key.

7. The apparatus of claim 5, wherein the security key corresponds to a serial number of the product, and is pre-stored in the security tag.

8. An apparatus for managing a product distribution, the apparatus comprising:
    a security tag to store a security key of a product, and to generate tag authentication information using the security key, wherein the security tag is attached to the product;
    a security server to generate server authentication information using the security key; and
    a security reader to determine whether the security tag is duplicated, based on the tag authentication information and the server authentication information.

9. The apparatus of claim 8, wherein the security key corresponds to a serial number of the product, and is pre-stored in the security tag.

* * * * *